(12) United States Patent
Goff et al.

(10) Patent No.: US 6,600,420 B2
(45) Date of Patent: *Jul. 29, 2003

(54) APPLICATION FOR A RADIO FREQUENCY IDENTIFICATION SYSTEM

(75) Inventors: Edward D. Goff, Oakdale, MN (US); Bernard A. Gonzalez, St. Paul, MN (US); Chester Piotrowski, White Bear Lake, MN (US); Ching-Long Tsai, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/908,956

(22) Filed: Jul. 19, 2001

(65) Prior Publication Data

US 2002/0011967 A1 Jan. 31, 2002

Related U.S. Application Data

(60) Division of application No. 09/368,745, filed on Aug. 5, 1999, now Pat. No. 6,335,686, which is a continuation-in-part of application No. 09/134,687, filed on Aug. 14, 1998, now abandoned.

(51) Int. Cl.[7] ............................................... G08B 13/14
(52) U.S. Cl. .................... 340/572.4; 343/879; 343/895; 340/572.6; 340/572.7
(58) Field of Search ..................... 343/700 MS, 878, 343/879, 895; 340/572.4, 572.6, 572.7

(56) References Cited

U.S. PATENT DOCUMENTS

| 3,747,086 A | 7/1973 | Peterson ...................... 340/280 |
| 3,752,960 A | 8/1973 | Walton ........................ 235/61 |
| 3,790,945 A | 2/1974 | Fearon ........................ 340/280 |
| 3,816,708 A | 6/1974 | Walton ........................ 235/61 |
| 4,063,229 A | 12/1977 | Welsh et al. ................. 340/280 |
| 4,141,078 A | 2/1979 | Bridges, Jr. et al. ......... 364/900 |
| 4,183,027 A | 1/1980 | Ehrenspeck .................. 343/726 |
| 4,223,830 A | 9/1980 | Walton ........................ 235/380 |
| 4,312,003 A | 1/1982 | Robbins, Jr. ................. 343/788 |
| 4,319,674 A | 3/1982 | Riggs et al. ................... 194/4 |
| 4,407,000 A | 9/1983 | Sasaki et al. ................ 343/726 |

(List continued on next page.)

FOREIGN PATENT DOCUMENTS

| DE | 43 19 878 | 12/1993 | ........... G06K/7/08 |
| DE | 44 15 801 | 9/1994 | ........... G08B/13/24 |
| DE | 43 41 880 A1 | 6/1995 | ........... G07C/11/00 |
| EP | 0 494 114 | 7/1992 | ........... G07C/9/00 |
| EP | 0 526 038 | 2/1993 | ........... G08B/13/24 |
| EP | 0 585 132 | 3/1994 | ........... G01S/13/78 |
| EP | 0 598 624 | 5/1994 | ........... G01S/13/02 |
| EP | 0 615 285 | 9/1994 | ........... H01L/21/60 |
| EP | 0 637 093 | 2/1995 | ........... H01Q/5/02 |
| EP | 0 689 151 | 12/1995 | ........... G06K/7/10 |
| EP | 0 702 323 A2 | 3/1996 | ........... G06K/17/00 |

(List continued on next page.)

OTHER PUBLICATIONS

John Bowers; "Road to intelligent tagging is paved with opportunities"; Automatic I.D. News; Oct. 1995; pp. 86–87.

Finkenzeller; "RFID Handbook—Radio–Frequency Identification Fundamentals and Applications"; 1999; pp. 227–273.

Jeff Hedlund et al.; "SmartBookcase" (2 pgs.) dated Sep. 13, 2001.

"SmartBookcase", Jeff Hedlund et al.; [date retrieved from the internet Sep. 13, 2001], <http://people.at1.mediaone.net/tlnewton/index.html>, (2 pgs.).

*Primary Examiner*—Don Wong
*Assistant Examiner*—Shih-Chao Chen
(74) *Attorney, Agent, or Firm*—Melissa E. Buss

(57) ABSTRACT

Antenna shelf tape is disclosed for use with items having radio frequency identification elements or tags associated with items of interest.

14 Claims, 6 Drawing Sheets

U.S. PATENT DOCUMENTS

| | | | | |
|---|---|---|---|---|
| 4,413,254 | A | 11/1983 | Pinneo et al. | 340/572 |
| 4,442,507 | A | 4/1984 | Roesner | 365/100 |
| 4,578,654 | A | 3/1986 | Tait | 333/175 |
| 4,580,041 | A | 4/1986 | Walton | 235/380 |
| 4,583,083 | A | 4/1986 | Bogasky | 340/572 |
| 4,598,276 | A | 7/1986 | Tait | 340/572 |
| 4,636,950 | A | 1/1987 | Caswell et al. | 364/403 |
| 4,656,463 | A | 4/1987 | Anders et al. | 340/572 |
| 4,656,592 | A | 4/1987 | Spaanenburg | 364/490 |
| 4,673,932 | A | 6/1987 | Ekchian et al. | 340/825 |
| 4,688,026 | A | 8/1987 | Scribner et al. | 340/572 |
| 4,745,401 | A | 5/1988 | Montean | 340/572 |
| 4,746,830 | A | 5/1988 | Holland | 310/313 |
| 4,746,908 | A | 5/1988 | Montean | 340/551 |
| 4,785,308 | A | 11/1988 | Newcomb | 343/795 |
| 4,796,074 | A | 1/1989 | Roesner | 357/51 |
| 4,805,232 | A | 2/1989 | Ma | 455/291 |
| 4,827,395 | A | 5/1989 | Anders et al. | 364/138 |
| 4,835,372 | A | 5/1989 | Gombrich et al. | 235/375 |
| 4,837,568 | A | 6/1989 | Snaper | 340/825 |
| 4,857,893 | A | 8/1989 | Carroll | 340/572 |
| 4,862,160 | A | 8/1989 | Ekchian et al. | 340/825 |
| 4,881,061 | A | 11/1989 | Chambers | 340/568 |
| 4,924,210 | A | 5/1990 | Matsui et al. | 340/572 |
| 4,964,053 | A | 10/1990 | Humble | 364/466 |
| 4,967,185 | A | 10/1990 | Montean | 340/572 |
| 5,019,815 | A | 5/1991 | Lemelson et al. | 340/933 |
| 5,036,308 | A | 7/1991 | Fockens | 340/572 |
| 5,059,951 | A | 10/1991 | Kaltner | 340/572 |
| 5,063,380 | A | 11/1991 | Wakura | 340/825 |
| 5,072,222 | A | 12/1991 | Fockens | 342/44 |
| 5,083,112 | A | 1/1992 | Piotrowski et al. | 340/572 |
| 5,095,362 | A | 3/1992 | Roesner | 357/23.4 |
| 5,099,226 | A | 3/1992 | Andrews | 340/572 |
| 5,099,227 | A | 3/1992 | Geiszler et al. | 340/572 |
| 5,103,222 | A | 4/1992 | Hogen Esch et al. | 340/825 |
| 5,119,070 | A | 6/1992 | Matsumoto et al. | 340/572 |
| 5,151,684 | A | 9/1992 | Johnsen | 340/572 |
| 5,153,842 | A | 10/1992 | Dlugos, Sr. et al. | 364/478 |
| 5,204,526 | A | 4/1993 | Yamashita | 235/493 |
| 5,214,409 | A | 5/1993 | Beigel | 340/572 |
| 5,214,410 | A | 5/1993 | Verster | 340/572 |
| 5,218,343 | A | 6/1993 | Stobbe et al. | 340/572 |
| 5,218,344 | A | 6/1993 | Ricketts | 340/573 |
| 5,260,690 | A | 11/1993 | Mann et al. | 340/572 |
| 5,280,159 | A | 1/1994 | Schultz et al. | 231/382 |
| 5,288,980 | A | 2/1994 | Patel et al. | 235/381 |
| 5,296,722 | A | 3/1994 | Potash et al. | 257/50 |
| 5,317,309 | A | 5/1994 | Vercellotti et al. | 340/825 |
| 5,331,313 | A | 7/1994 | Koning | 340/551 |
| 5,334,822 | A | 8/1994 | Sanford | 235/385 |
| 5,339,074 | A | 8/1994 | Shindley et al. | 340/825 |
| 5,347,263 | A | 9/1994 | Carroll et al. | 340/572 |
| 5,347,280 | A | 9/1994 | Schuermann | 342/42 |
| 5,353,011 | A | 10/1994 | Wheeler et al. | 340/572 |
| 5,378,880 | A | 1/1995 | Eberhardt | 235/439 |
| 5,392,028 | A | 2/1995 | Pichl | 340/572 |
| 5,401,584 | A | 3/1995 | Minasy et al. | 428/611 |
| 5,406,263 | A | 4/1995 | Tuttle | 340/572 |
| 5,407,851 | A | 4/1995 | Roesner | 437/47 |
| 5,420,757 | A | 5/1995 | Eberhardt et al. | 361/813 |
| 5,424,858 | A | 6/1995 | Gillotte | 359/143 |
| 5,430,441 | A | 7/1995 | Bickley et al. | 340/825 |
| 5,432,864 | A | 7/1995 | Lu et al. | 382/118 |
| 5,444,223 | A | 8/1995 | Blama | 235/435 |
| 5,446,447 | A | 8/1995 | Carney et al. | 340/572 |
| 5,448,110 | A | 9/1995 | Tuttle et al. | 257/723 |
| 5,448,220 | A | 9/1995 | Levy | 340/539 |
| 5,450,070 | A | 9/1995 | Massar et al. | 340/825 |
| 5,450,492 | A | 9/1995 | Hook et al. | 380/28 |
| 5,469,363 | A | 11/1995 | Saliga | 364/478 |
| 5,471,203 | A | 11/1995 | Sasaki et al. | 340/825 |
| 5,490,079 | A | 2/1996 | Sharpe et al. | 364/467 |
| 5,497,140 | A | 3/1996 | Tuttle | 342/51 |
| 5,499,017 | A | 3/1996 | Beigel | 340/572 |
| 5,517,195 | A | 5/1996 | Narlow et al. | 342/51 |
| 5,519,381 | A | 5/1996 | Marsh et al. | 340/572 |
| 5,521,601 | A | 5/1996 | Kandlur et al. | 342/44 |
| 5,528,222 | A | 6/1996 | Moskowitz et al. | 340/572 |
| 5,528,251 | A | 6/1996 | Frein | 343/749 |
| 5,537,105 | A | 7/1996 | Marsh et al. | 340/825 |
| 5,539,394 | A | 7/1996 | Cato et al. | 340/825 |
| 5,539,775 | A | 7/1996 | Tuttle et al. | 375/200 |
| 5,541,585 | A | 7/1996 | Duhame et al. | 340/825 |
| 5,541,604 | A | 7/1996 | Meier | 342/42 |
| 5,550,547 | A | 8/1996 | Chan et al. | 342/42 |
| 5,554,974 | A | 9/1996 | Brady et al. | 340/572 |
| 5,565,846 | A | 10/1996 | Geiszler et al. | 340/572 |
| 5,565,858 | A | 10/1996 | Guthrie | 340/825 |
| 5,574,372 | A | 11/1996 | Moritz et al. | 324/318 |
| 5,589,820 | A | 12/1996 | Robinson et al. | 340/572 |
| 5,602,527 | A | 2/1997 | Suenaga | 340/551 |
| 5,602,538 | A | 2/1997 | Orthmann et al. | 340/825 |
| 5,604,486 | A | 2/1997 | Lauro et al. | 340/572 |
| 5,625,341 | A | 4/1997 | Giles et al. | 340/572 |
| 5,629,981 | A | 5/1997 | Nerlikar | 380/25 |
| 5,635,693 | A | 6/1997 | Benson et al. | 235/384 |
| 5,640,002 | A | 6/1997 | Ruppert et al. | 235/472 |
| 5,646,592 | A | 7/1997 | Tuttle | 340/572 |
| 5,682,142 | A | 10/1997 | Loosmore et al. | 340/572 |
| 5,682,143 | A | 10/1997 | Brady et al. | 340/572 |
| 5,689,238 | A | 11/1997 | Cannon, Jr. et al. | 340/568 |
| 5,694,139 | A | 12/1997 | Saito et al. | 343/866 |
| 5,705,818 | A | 1/1998 | Kelbel et al. | 250/361 |
| 5,708,423 | A | 1/1998 | Ghaffari et al. | 340/825 |
| 5,739,765 | A | 4/1998 | Stanfield et al. | 340/825 |
| 5,745,036 | A | 4/1998 | Clare | 340/572 |
| 5,751,221 | A | 5/1998 | Stanfield et al. | 340/825 |
| 5,751,257 | A | 5/1998 | Sutherland | 345/2 |
| 5,785,181 | A | 7/1998 | Quartararo, Jr. | 209/3.3 |
| 5,786,764 | A | 7/1998 | Engellenner | 340/572 |
| 5,822,714 | A | 10/1998 | Cato | 702/108 |
| 5,859,587 | A | 1/1999 | Alicot et al. | 340/572 |
| 5,929,801 | A | 7/1999 | Aslanidis et al. | 342/44 |
| 5,936,527 | A | 8/1999 | Isaacman et al. | 340/572.1 |
| 5,939,984 | A | 8/1999 | Brady et al. | 340/572 |
| 5,963,134 | A | 10/1999 | Bowers et al. | 340/572 |
| 5,995,017 | A | 11/1999 | Marsh et al. | 340/825 |
| 6,078,251 | A | 6/2000 | Landt et al. | 340/10.41 |
| 6,127,928 | A | 10/2000 | Issacman et al. | 340/572.1 |
| 6,150,921 | A | 11/2000 | Werb et al. | 340/10.1 |
| 6,154,137 | A | 11/2000 | Goff et al. | 340/572.4 |
| D435,557 | S | 12/2000 | Eisenberg et al. | D14/428 |
| 6,232,870 | B1 | 5/2001 | Garber et al. | 340/10.1 |

FOREIGN PATENT DOCUMENTS

| | | | |
|---|---|---|---|
| EP | 0 710 853 | 5/1996 | G01S/13/75 |
| EP | 0 740 262 | 10/1996 | G06K/7/10 |
| EP | 0 747 990 | 12/1996 | H01Q/1/24 |
| EP | 0 762 535 | 3/1997 | H01Q/7/06 |
| EP | 0 794 507 A2 | 9/1997 | G06K/17/00 |
| EP | 0 805 507 | 11/1997 | H01Q/1/27 |
| EP | 0 810 567 | 12/1997 | G08B/13/24 |
| EP | 0 825 672 | 2/1998 | H01Q/5/00 |
| FR | 2 701 146 | 8/1994 | G09F/3/02 |
| GB | 2 098 768 | 11/1982 | G06K/7/08 |
| GB | 2 186 467 | 8/1987 | G08B/13/24 |
| GB | 2 306 726 A | 5/1997 | G08C/15/06 |
| JP | 04047995 | 2/1992 | B42D/15/10 |
| JP | 07254092 | 10/1995 | G08B/13/24 |
| JP | 8-108911 | 4/1996 | B65G/1/137 |

| | | | | | | | | |
|---|---|---|---|---|---|---|---|---|
| NL | 9400091 | 9/1995 | ........... A01K/11/00 | WO | WO 98/13805 | 4/1998 | ........... G08B/23/00 |
| WO | WO 95/12870 | 5/1995 | ........... G08B/13/14 | WO | WO 98/16070 | 4/1998 | ............ H04Q/1/00 |
| WO | WO 97/15031 | 4/1997 | ............. G07F/7/06 | WO | WO 98/27670 | 6/1998 | ............ H04B/7/08 |
| WO | WO 97/29464 | 8/1997 | ........... G08B/13/24 | WO | WO 99/05659 | 2/1999 | ........... G08B/13/14 |
| WO | WO 97/36270 | 10/1997 | ........... G08B/13/24 | WO | WO 99/05660 | 2/1999 | ........... G08B/13/14 |
| WO | WO 97/50057 | 12/1997 | ........... G06M/1/12 | WO | WO 99/65006 | 12/1999 | ........... G08B/17/00 |
| WO | WO 98/13800 | 4/1998 | ........... G08B/13/14 | WO | WO 00/16280 | 3/2000 | ........... G08B/13/14 |
| WO | WO 98/13804 | 4/1998 | ......... G08B/13/181 | | | | |

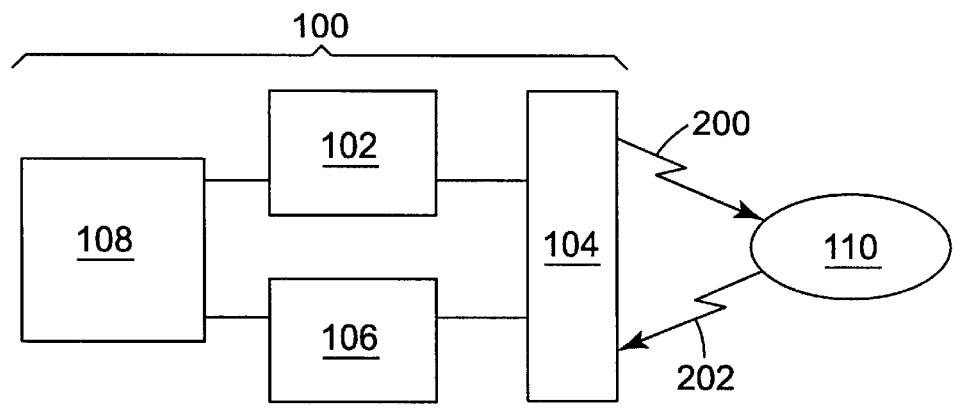
Fig. 4
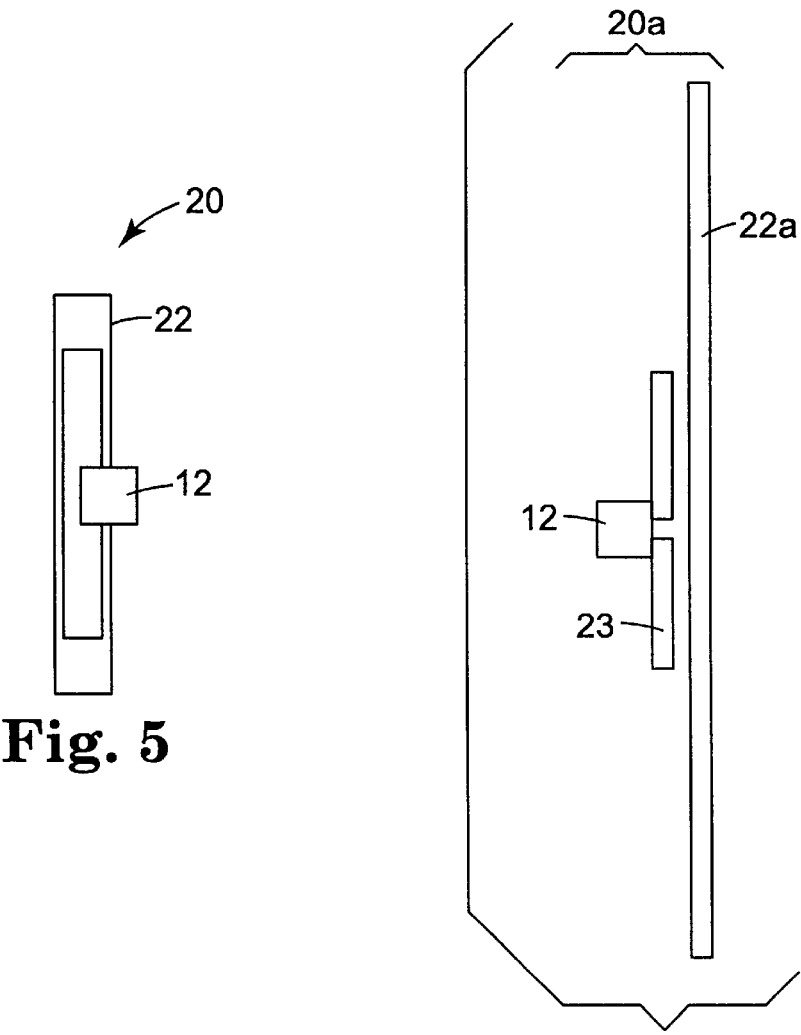
Fig. 5
Fig. 6

APPLICATION FOR A RADIO FREQUENCY IDENTIFICATION SYSTEM

RELATED APPLICATION AND INCORPORATION BY REFERENCE

This patent application is a division of U.S. application Ser. No. 09/368,745, filed Aug. 5, 1999, now U.S. Pat. No. 6,335,686 which is a continuation-in-part of and claims priority from U.S. application Ser. No. 09/134,687, filed Aug. 14, 1998 with the same title, which was assigned to the assignee of the present invention, and the contents of which is incorporated by reference herein.

TECHNICAL FIELD

The invention relates to applications for radio frequency identification (RFID) systems, and particularly to the use of such systems in libraries.

BACKGROUND OF THE INVENTION

Electronic article surveillance ("EAS") systems detect the presence of small electronic devices placed on or in an article or carried by a person of interest, and are often used in retail or library environments to deter theft or other unauthorized removal of articles. These devices, which are commonly known as tags or markers, have in the past contained only information regarding the presence of an item. This information could be obtained by electronically interrogating the tag, either intermittently or continuously. At least four distinct types of EAS systems have evolved over the years, based on how this interrogation was carried out: magnetic, magnetomechanical, radio frequency (RF), and microwave. Of these four, magnetic systems have provided the highest level of security in most applications. Magnetic tags are easily hidden in or on an object, difficult to detect (because they are less susceptible to shielding, bending, and pressure), and easy to deactivate and reactivate, thereby providing a high degree of security and some information regarding the status of the tagged article.

Many users of EAS systems desire to know more than just whether a tagged object is present. They also want to know which tagged object is present, for example. Detailed information regarding the characteristics of objects, such as their date of manufacture, inventory status, and owner have generally been communicated to automated handling and control systems through an optical bar code. While inexpensive and effective, the optical bar code system has certain limitations. Bar codes must be visible, which limits the locations in which they may be placed, and bar codes can easily be obscured, either accidentally or intentionally. The range at which a detector can sense the bar code is also comparatively small. The bar code may also have to be appropriately positioned for detection. Also, because bar codes are often exposed to permit detection, the barcode is susceptible to damage that can result in detection failures. Lastly, multiple items must be processed one at a time. These constraints of bar code systems make them undesirable or inefficient for some applications, such as marking library media.

More recently, electronic identification (also known as radio frequency identification or RFID) techniques have been developed to address the limitations of optical barcodes. RFID systems have succeeded in providing object identification and tracking, but are deficient in providing object security because most RFID systems operate in frequency ranges (~1 MHz and above) in which the tag is easily defeated. The security deficiency associated with radio frequency tags arises because they can be "shielded" by, for example, covering the tag with a hand or aluminum foil, or even placing the tag in a book. Even battery-powered radio frequency tags may be blocked, although their range is superior and blocking would be more difficult. Thus, objects tagged with an RFID tag may escape detection, either inadvertently or intentionally. This greatly reduces their effectiveness as security devices. RFID markers are also related to "smart cards." Both contact and contactless smart cards have appeared in commercial applications. Smart cards tend to be associated with a specific person rather than with a tagged object. Issues related to the security and tracking of the smart card (or of the person carrying it) are similar to those discussed above for RFID markers.

The security issues associated with RFID markers are similar to those familiar to anyone skilled in the art of radio frequency- and microwave-based EAS tags. Substantial effort has been expended in attempts to remedy the deficiencies of radio frequency- and microwave-based EAS tags. However, none has substantially improved their performance as security tags. U.S. Pat. No. 5,517,195 (Narlow et al.), entitled "Dual Frequency EAS Tag with Deactivation Coil," describes a dual frequency microwave EAS tag that includes an antenna circuit having a diode, and a deactivation circuit. The deactivation circuit responds to a low energy alternating magnetic field by inducing a voltage in the diode of the antenna circuit so as to disable the diode and the antenna, thereby deactivating the tag. Although useful for some applications, the capacitor-based tag disclosed in Narlow et al. may leak electrical charge over time, which could cause the tag to become activated unintentionally.

Radio frequency EAS tags of the type disclosed in U.S. Pat. No. 4,745,401 (Montean et al.) include a magnetic element. The magnetic element alters the tuning of the tag when it has been suitably magnetized by an accessory device, and thereby blocks the radio frequency response of the tag. Although these tags have a certain utility, they still do not address the issues of enhanced security and identification.

Radio frequency identification technology has been developed by a number of companies, including Motorola/Indala (see U.S. Pat. Nos. 5,378,880 and 5,565,846), Texas Instruments (see U.S. Pat. Nos. 5,347,280 and 5,541,604), Mikron/Philips Semiconductors, Single Chip Systems (see U.S. Pat. Nos. 4,442,507; 4,796,074; 5,095,362; 5,296,722; and 5,407,851), CSIR (see European document numbers 0 494 114 A2; 0 585 132 A1; 0 598 624 A1; and 0 615 285 A2), IBM (see U.S. Pat. Nos. 5,528,222; 5,550,547; 5,521,601; and 5,682,143), and Sensormatic Electronics (see U.S. Pat. No. 5,625,341). These tags all attempt to provide remote identification without the need for a battery. They operate at frequencies ranging from 125 KHz to 2.45 GHz. The lower frequency tags (~125 KHz) are moderately resistant to shielding, but have only limited radio frequency functionality due to bandwidth constraints. In particular, systems based on these markers generally operate reliably only when a single tag is in the interrogation zone at a time. They also tend to be relatively bulky and expensive to manufacture. At higher frequencies, (typically 13.56 MHz, 915 MHz, and 2.45 GHz), the added bandwidth available has permitted the development of systems which can reliably process multiple tags in the interrogation zone in a short period of time. This is highly desirable for many product applications. In addition, some of the tag designs hold the promise of being relatively inexpensive to manufacture and therefore more attractive to a customer. However, these higher frequency devices share to varying degrees the susceptibility to shielding discussed earlier. Thus, they cannot provide the high level of security demanded in certain applications, such as a library From the foregoing discussion, it should be clear that there are a number of applications for RFID tags in various environments in which the identity of the tagged item is important. For example, PCT Publication WO 99/05660, published Feb. 4, 1999 and assigned to Checkpoint Systems, Inc., describes an inventory system using articles with RFID tags. The preferred embodiment described therein contemplates the use of RFID tags in library materials, which may then be checked out automatically by interrogating the RFID tag to determine the identify of the material. However, a number of important or desirable library or other inventory functions remain that are not described or suggested in the '660 publication.

SUMMARY OF THE INVENTION

The present invention relates to RFID devices, and to antenna systems for enabling an RFID device to interrogate items of interest that are near the antenna system. The RFID antenna system is used in connection with items that are associated with an RFID tag, and optionally a magnetic security element. The devices and applications are described with particular reference to library materials such as books, periodicals, and magnetic and optical media. Other applications for the present invention are also envisioned.

BRIEF DESCRIPTION OF THE DRAWINGS

The present invention is described in greater detail with reference to the attached Figures, in which like numbers represent like structure throughout the several views, and in which

FIG. 4 is a block diagram of an RFID interrogation system interacting with an RFID tag;

FIGS. 5, 6, 7, and 8 are illustrations of combination tags according to the present invention.

DETAILED DESCRIPTION OF THE INVENTION

Figure 1A:
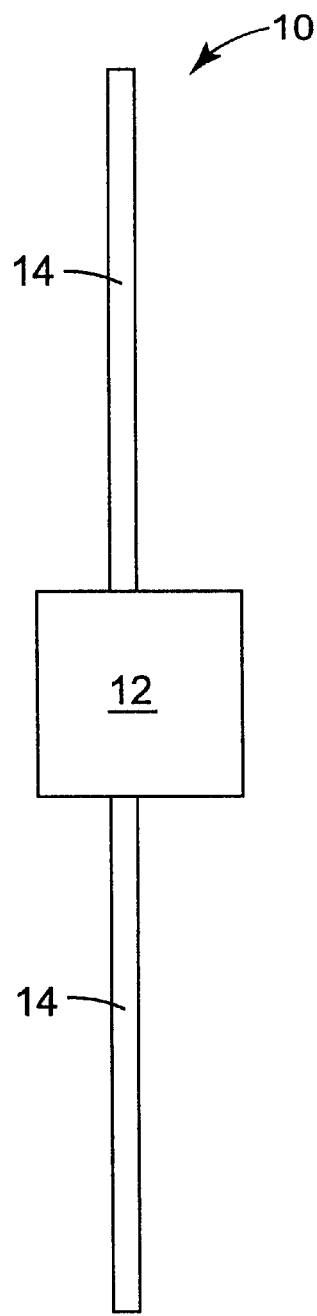
FIGS. 1A and 1B are schematic illustrations of radio frequency identification tags.

The embodiments of the present invention described herein make use of RFID tags, and preferably of combination RFID/magnetic security tags. Tags of this type were disclosed in U.S. application Ser. No. 09/093,120, filed Jun. 8, 1998 and entitled "Identification Tag With Enhanced Security," which was assigned to the assignee of the present invention and was incorporated by reference into the U.S. application from which the present application claims priority. A detailed description of the magnetic, RFID, and combination tags used in conjunction with the embodiments of the present invention is described in Section I, below, and the embodiments of the present invention are then set forth in detail in Section II, below.

I. Tags and Elements For Use With Embodiments of the Present Invention

A tag used with the embodiments of the invention described in Section II, below, may incorporate both object identification and effective security in a single device. They preferably include an element that is responsive to a magnetic interrogation signal, and an element that is responsive to a radio frequency interrogation signal. In one embodiment, the magnetically-responsive element also provides the antenna for the radio frequency-responsive element. The term "responsive" means, in the context of the present invention, that the element provides intelligible information when subjected to an appropriate interrogation field. The individual elements are described first below, followed by a description of a combination tag. As will become apparent, the embodiments of the present invention described in Section II, below, may include either an RFID element alone, or a combination of an RFID element and a magnetic security element.

A. The Magnetically-Responsive Element

The magnetically-responsive element is preferably made of a low coercive force, high permeability ferromagnetic material, such as the material used in the strips sold by the Minnesota Mining and Manufacturing Company of St. Paul, Minn. (3M) under the designation "TATTLE-TAPE™" brand strips. These strips, or marker assemblies, are described in several patents assigned to 3M, including U.S. Pat. Nos. 5,331,313 (Koning) and 3,747,086 (Peterson), the contents of which are incorporated by reference herein. Exemplary low coercive force, high permeability ferromagnetic materials include permalloy (a nickel/iron alloy), and high performance amorphous metals such as those available from the AlliedSignal Company of Morristown, N.Y. under the designations Metglas 2705M and Metglas 2714A.

The magnetically-responsive element may be either single status or dual status, depending on the nature of the article with which the element is associated. For example, certain reference books in libraries are not to be removed from the library, and thus a single-status (non-deactivatable) marker would always indicate whether such a book passed within an interrogation zone. Other articles, such as common library materials or commercial goods, may require a dual-status marker assembly, so that when the article has been properly processed the marker may be appropriately deactivated to prevent detection by the interrogation source. Dual status functionality is generally provided through the addition of sections of higher coercivity magnetic material in proximity to the low coercivity magnetic material, as described below and in the Peterson patent incorporated by reference above.

Certain magnetically-responsive elements have the ability to switch magnetic orientation rapidly when passed through a low frequency alternating magnetic field (50 Hz to 100 KHz, for example), and to produce a predetermined characteristic response that may be detected by the receiving coils of a detector. The switching function of the marker assembly is controlled by the magnetization state of the high coercive force elements, or "keeper elements." When these keeper elements are magnetized, the ability of the marker to magnetically switch back and forth within the alternating magnetic field of the interrogation zone is altered, and the marker typically is not detected. When the keeper elements are demagnetized, the marker can again perform the switching function, enabling the interrogation source to detect the presence of the marker. The keeper elements may be provided in different ways, as is known in the art.

The marker assembly may also include adhesive on one or both sides thereof, to enable the marker to be bonded to a book or other article. The adhesive layer(s) may be covered by a removable liner, to prevent adhesion of the marker to an unintended surface prior to application to the intended surface. These and other features of the marker assembly are described in the U.S. Pat. Nos. 3,790,945 (Fearon), 5,083,112 (Piotrowski), and 5,331,313 (Koning), all incorporated by reference above.

Because low frequency magnetic elements of this type are difficult to shield from detection, they may be effectively used on a wide variety of items when security is important. In addition, they may be deactivated and reactivated more conveniently, completely, and repeatedly than markers employing other EAS technologies, making them more suitable for use in certain applications (such as libraries) where this characteristic is highly desirable.

B. The Radio Frequency-Responsive Element

RFID tags can be either active or passive. An active tag incorporates an additional energy source, such as a battery, into the tag construction. This energy source permits active RFID tags to create and transmit strong response signals even in regions where the interrogating radio frequency field is weak, and thus an active RFID tag can be detected at greater range. However, the relatively short lifetime of the battery limits the useful life of the tag. In addition, the battery adds to the size and cost of the tag. A passive tag derives the energy needed to power the tag from the interrogating radio frequency field, and uses that energy to transmit response codes by modulating the impedance the antenna presents to the interrogating field, thereby modulating the signal reflected back to the reader antenna. Thus, their range is more limited. Because passive tags are preferred for many applications, the remainder of the discussion will be confined to this class of tag. Those skilled in the art, however, will recognize that these two types of tags share many features and that both can be used with this invention.

Figure 1B:
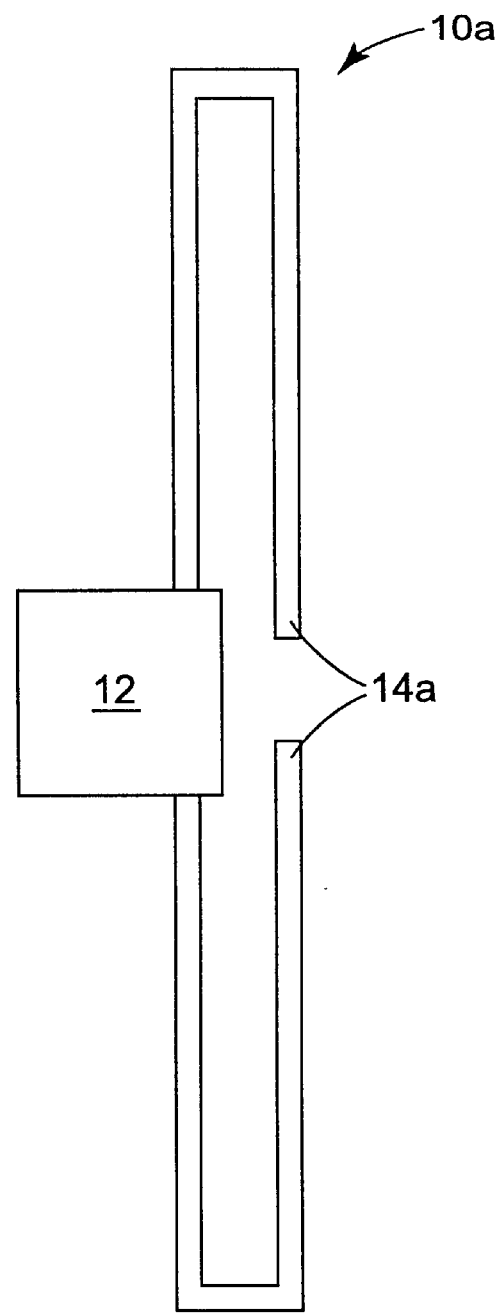

As shown in FIG. 1, a passive radio frequency-responsive element 10 typically includes two components: an integrated circuit 12 and an antenna 14. The integrated circuit provides the primary identification function. It includes software and circuitry to permanently store the tag identification and other desirable information, interpret and process commands received from the interrogation hardware, respond to requests for information by the interrogator, and assist the hardware in resolving conflicts resulting from multiple tags responding to interrogation simultaneously. Optionally, the integrated circuit may provide for updating the information stored in its memory (read/write) as opposed to just reading the information out (read only). Integrated circuits suitable for use in RFID markers include those available from Texas Instruments (in their TIRIS or Tag-it line of products), Philips (in their I-Code, Mifare and Hitag line of products), Motorola/Indala, and Single Chip Systems, among others.

The antenna geometry and properties depend on the desired operating frequency of the RFID portion of the tag. For example, 2.45 GHz (or similar) RFID tags would typically include a dipole antenna, such as the linear dipole antennas 14 shown in FIG. 1A, or the folded dipole antennas 14a shown attached to the radio frequency responsive element 10a in FIG. 1B. A 13.56 MHz (or similar) RFID tag would use a spiral or coil antenna 14b, as shown attached to the radio frequency responsive element 10b in FIG 2. In either ease, the antenna 14 intercepts the radio frequency energy radiated by an interrogation source. This signal energy carries both power and commands to the tag. The antenna enables the RF-responsive element to absorb energy sufficient to power the IC chip and thereby provide the response to be detected. Thus, the characteristics of the antenna must be matched to the system in which it is incorporated. In the case of tags operating in the high MHz to GHz range, the most important characteristic is the antenna length. Typically, the effective length of a dipole antenna is selected so that it is close to a half wavelength or multiple half wavelength of the interrogation signal. In the case of tags operating in the low to mid MHz region (13.56 MHz, for example) where a half wavelength antenna is impractical due to size limitations, the important characteristics are antenna inductance and the number of turns on the antenna coil. For both antenna types, good electrical conductivity is required. Typically, metals such as copper or aluminum would be used, but other conductors, including magnetic metals such as permalloy, are also acceptable and are, in fact, preferred for purposes of this invention. It is also important that the input impedance of the selected IC chip match the impedance of the antenna for maximum energy transfer. Additional information about antennas is known to those of ordinary skill in the art from, for example, reference texts such as J.D. Kraus, Antennas (2d ed. 1988, McGraw-Hill, Inc., New York).

Figure 2:
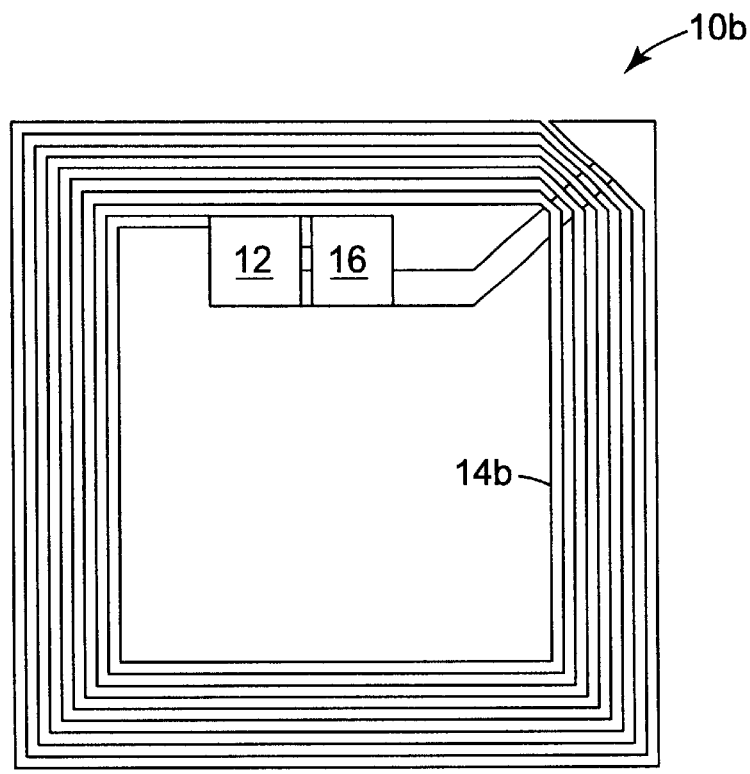
FIG. 2 is a schematic of a second embodiment of a radio frequency identification tag.

A capacitor 16 is often included to increase the performance of the marker, as shown in FIG. 2. The capacitor 16, when present, tunes the operating frequency of the tag to a particular value. This is desirable for obtaining maximum operating range and insuring compliance with regulatory requirements. The capacitor may either be a discrete component, or integrated into the antenna as described below. In some tag designs, particularly tags designed to operate at very high frequencies, such as 2.45 GHz, a tuning capacitor is not required. The capacitor is selected so that, when coupled to the inductance provided by the antenna, the resonant frequency of the composite structure, given by:

$$f_r = \left(\frac{1}{2\pi}\right)\sqrt{\frac{1}{LC}}$$

where
  C=capacitance (in Farads)
  L=inductance (in Henries)
closely matches the desired operating frequency of the RFID system. The capacitor may also be a distributed capacitor as described in U.S. Pat. Nos. 4,598,276 (Tait et al.) and 4,578,654 (Tait et al.), which are assigned to 3M. Distributed capacitance is desirable to reduce tag size, particularly thickness, and to minimize manual assembly.

In operation, as shown in FIG. 4, the radio frequency-responsive tag 110 is interrogated by an EAS security system 100, which is typically located near the point at which the tags are to be monitored. An interrogation zone may be established by placing spaced detection panels across the exits from the room in which the tagged articles are located, near a conveyor carrying items to be monitored, or the like. Hand held detection devices may also be used. An interrogation source 102 (typically including a drive oscillator and an amplifier) is coupled to an antenna 104 (sometimes described as a field coil) for transmitting an alternating radio frequency field, or interrogation signal, in the interrogation zone. The system 100 also includes an antenna for receiving a signal (shown as antenna 104, and sometimes described as a receiving coil) and detector 106 for processing signals produced by tags in the interrogation zone.

The interrogation source 102 transmits an interrogation signal 200, which may be selected within certain known frequency bands that are preferred because they do not interfere with other applications, and because they comply with applicable government regulations. When the radio frequency-responsive element receives an interrogation signal it transmits its own response code signal 202 that is received by the antenna 104 and transmitted to detector 106. The detector decodes the response, identifies the tag (typically based on information stored in a computer or other memory device 108), and takes action based on the code signal detected. Various modifications of the illustrated system are known to those of skill in the art including, for example, using separate antennas for the interrogation source 102 and the detector 106 in place of the single antenna 104 that is illustrated.

Modern RFID tags also provide significant amounts of user accessible memory, sometimes in the form of read-only memory or write-once memory, but more preferably offering the user the ability to repeatedly update the memory by rewriting its contents from a distance. The amount of memory provided can vary, and influences the size and cost of the integrated circuit portion of an RFID tag. Typically, between 128 bits and 512 bits of total memory can be provided economically. For example an RFID tag available from Texas Instruments of Dallas, Tex., under the designation "Tag-it" provides 256 bits of user programmable memory in addition to 128 bits of memory reserved for items such as the unique tag serial number, version and manufacturing information, and the like. Similarly, an RFID tag available from Philips Semiconductors of Eindhoven, Netherlands, under the designation "I-Code" provides 384 bits of user memory along with an additional 128 bits reserved for the aforementioned types of information.

This user accessible memory may be exploited to enhance the performance of an item identification system deployed, for example, in a library environment. Presently, libraries identify items by scanning an optical barcode. The unique identifier contained in this barcode is used to access a circulation database including software provided by library automation vendors (LAV software), where more extensive information about the item is permanently maintained. While this system has been highly developed and works very well in many applications, it may have two disadvantages. First, a connection to the circulation database must be established to access the information. This limits the availability of the information when an item is at a location remote from a connection to this database. Second, the retrieval of information from the circulation database can sometimes require an unacceptably long time, particularly during periods of heavy use. By storing certain critical items of information on the RFID tag, both of these limitations can be overcome.

One example of information which could improve the performance of a library identification system if present on the RFID tag itself would be a library identification number. Then, without accessing a database, an item's "home" library could be quickly and conveniently determined by simply scanning the RFID label. Another example of information preferably present on an RFID tag itself would be a code designating whether the item was a book, a video tape, an audio tape, a CD, or some other item. This code could, for example, comprise the media type code specified in the 3M Standard Interchange Protocol, which is available from the assignee of the present invention. By immediately knowing the media type, a library's material management systems could insure that an item was being appropriately processed without incurring the delay and inconvenience of consulting a remote circulation database. Other examples of information suitable for incorporation into the RFID label will be apparent to those skilled in the art.

Another area in which RFID systems offer an advantage over barcode-based systems is in the identification of multiple items. By using sophisticated software algorithms, RFID readers and markers cooperate to insure that all items in the reader's interrogation zone are successfully identified without intervention by the operator. This capability enables the development of numerous useful applications in the areas of inventory control, item tracking, and sorting that would be difficult of impossible to implement with barcode-based identification systems.

C. The Combination Tag

As shown in FIGS. 3 and 5 through 8, the combination tag 20 combines a magnetically-responsive element with an RF-responsive element to provide the advantages of both. Thus, the two elements can be applied to an item of interest at the same time, thereby reducing cost. The combination tag may be provided with a pressure sensitive adhesive covered by a removable liner, which enables the combination tag to be adhered to a surface of the article when the liner has been removed. In another embodiment, the tag uses the magnetically-responsive element as an antenna for the radio frequency-responsive element. The magnetically-responsive element, when used as an antenna, is electrically coupled to the radio frequency-responsive element, and may or may not also be physically coupled to the radio frequency-responsive element.

The combination tag made according to the present invention may be interrogated two ways. First, the RFID interrogation source would use radio frequency signals to request and receive codes from the integrated circuit. This information would indicate, for example, the identification of the article with which the tag is associated, and whether the article had been properly processed. Second, a magnetic interrogation field would interrogate the tag to determine whether the magnetic portion of the marker assembly was active. If the marker assembly was active, the interrogation source would produce a response, such as a notification that the marked article had not been properly processed. Because the magnetic interrogation is more resistant to shielding than the radio frequency interrogation, the magnetic portion of the combination tag would provide enhanced security. Thus, the features of both magnetic and RFID tags are combined into a single combination tag.

In a preferred embodiment, the combination tag includes a magnetically-responsive element that also functions as the antenna in the circuitry of the radio frequency-responsive element. To serve both functions, the antenna material must exhibit low magnetic coercivity and very high magnetic permeability (to serve as an efficient security element), and moderate to high electrical conductivity (to function as an efficient antenna). In addition, the geometry of the antenna must be compatible with both functions. In this embodiment, the antenna could, for example, be fabricated from permalloy, an alloy of nickel and iron.

In one embodiment, a 3M "Tattle-Tape™" brand security strip, or other equivalent magnetic element, may be used as a linear dipole antenna to operate at 2.45 GHz or a similar high frequency. The length, width and thickness of this strip are selected to match the particular operating frequency and other characteristics of the RFID chip used. Typically, the strip would be made from permalloy (available from a number of sources including Carpenter Specialty Alloys, Reading, Pa., under the trade name "HyMu80") or an amorphous alloy such as that available from the AlliedSignal Company of Morristown, N.Y., under the designation 2705M, and its length would be between 6.35 and 16.5 cm (2.5 and 6.5 inches). The terminals of the integrated circuit would be physically connected to the ends of the security strip. Electrical measurements of impedance and power gain have established that such a magnetic strip provides the same fundamental electrical characteristics as the copper or aluminum dipole antennas normally used with such a chip, and thus it would be expected to perform both functions satisfactorily.

Figure 7:
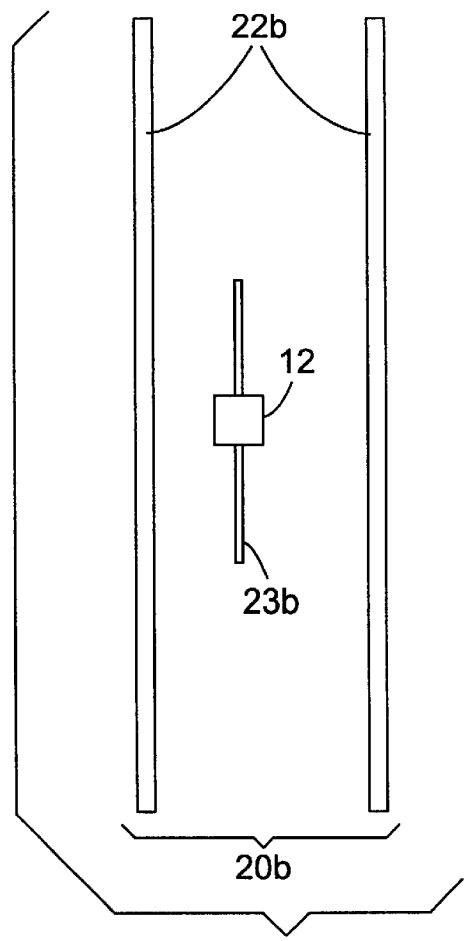
Figure 8:
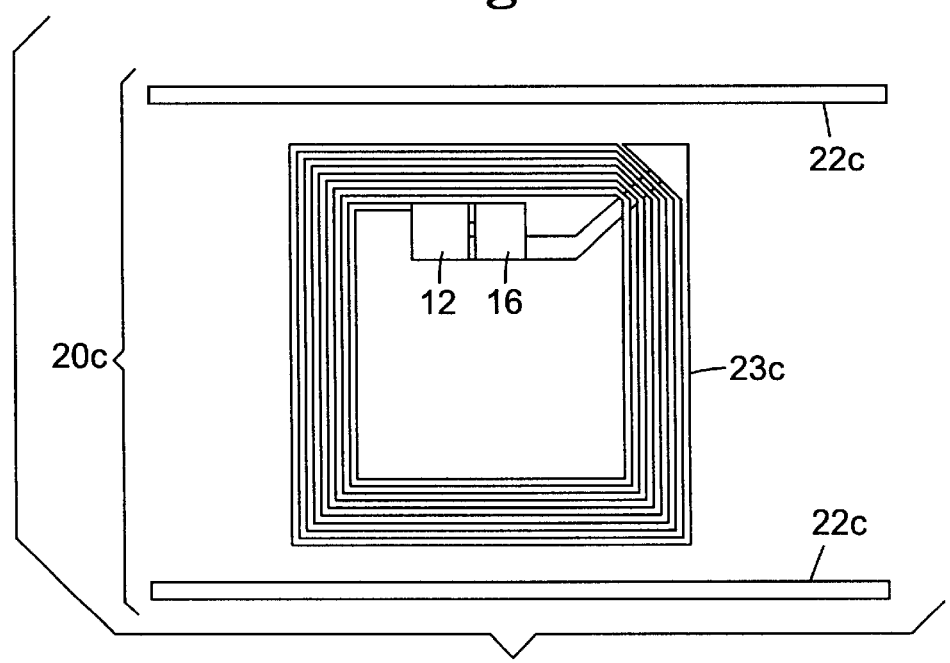

When the magnetically-responsive element is used as at least part of the antenna for the radio frequency-responsive element, the two are electrically coupled to each other. Electrical coupling may occur because of a physical connection between multiple elements (as shown in FIG. 5), or, in the absence of a physical connection, by non-contact electromagnetic coupling (as shown in FIGS. 6, 7, and 8). Non-contact coupling can include parasitic coupling, capacitive coupling, or inductive coupling, and use such antenna components as parasitic antenna elements, reflector and director antennas, Yagi-Uda antennas, or other suitable antenna configurations.

Figure 3:
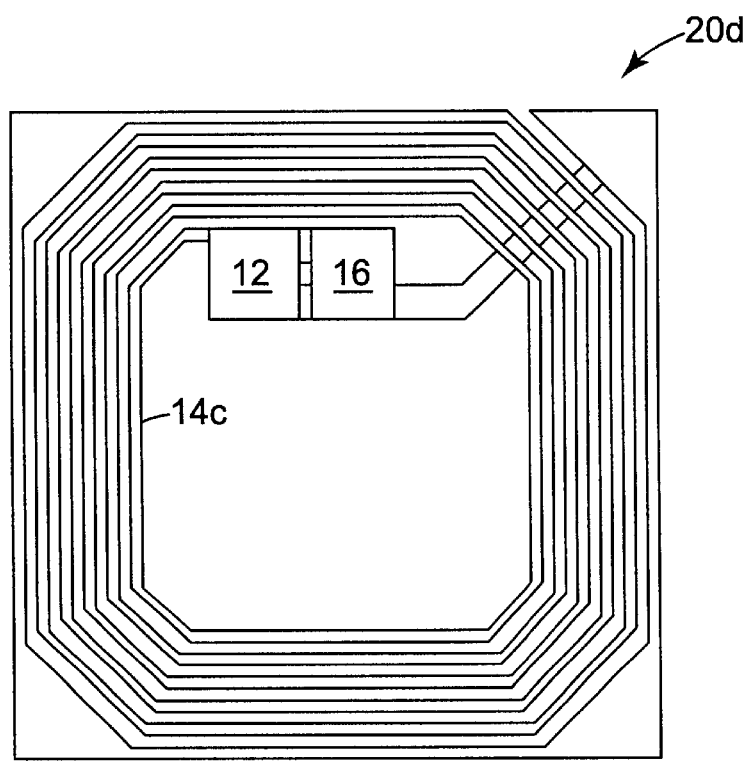
FIG. 3 is a schematic top view of a combination tag.

The combination tag shown in FIG. 3 includes coil turns made from magnetic material. The tag could be, for example, a 13.56 MHz tag having an antenna structure such as 14c in which flux collectors are provided at the corners to improve the magnetic function of the tag. Other types of flux collectors may be provided.

The combination tag 20 shown in FIG. 5 includes a physical connection between the antenna 22, which is made of magnetically-responsive material, and the integrated circuit 12. One or more keeper elements or the type described above also may be applied to the magnetically-responsive material, so that it may be selectively activated and deactivated to provide a dual status tag. The antenna 22a shown in FIG. 6, however, is not physically connected to the integrated circuit 12 or the dipole antenna 23, but is nonetheless electrically coupled to the dipole antenna by parasitic dipole coupling to provide a combination tag 20a. The dipole antenna 23 may comprise either magnetically-responsive material or non-magnetically-responsive material.

FIGS. 7 and 8 illustrate embodiments in which more than one antenna 22 is provided to electrically couple with antennas 23b and 23c, respectively. In the combination tag 20b shown in FIG. 7, integrated circuit 12 includes dipole antenna 23b, which is parasitically coupled to antennas 22b. Antennas 22b are made of magnetically-responsive material, and antenna(s) 23b may be made of magnetically-responsive material. In the combination tag 20c shown in FIG. 8, a radio frequency-responsive element of the type shown in FIG. 2 is parasitically electrically coupled to antennas 22c. Antennas 22c are made of magnetically-responsive material, and antenna(s) 23c may be made of magnetically-responsive material. Other variations of these embodiments are easily designed.

The overall thickness of the combination tag should be as small as possible, to enable the tag to be inconspicuously placed on or in an article. For example, the tag may be applied with adhesive between the pages of a book, and it is desirable to make the tag thin enough to prevent easy detection by observing the end of the book. Conventional ICs may be approximately 0.5 mm (0.02 in) thick, and the overall thickness of the tag is preferably less than 0.635 mm (0.025 in).

The combination tags of this invention may be provided in roll form, to enable the automated sequential application of individual tags to articles. This general system is described in, for example, PCT Publication No. WO 97/36270 (DeVale et al.). Individual combination tags, one or more surfaces of which may be covered by an adhesive (such as a pressure sensitive adhesive), may be removed from the roll and applied between two pages of a book, near its binding. A page spreader may be provided to facilitate insertion of the combination tag, and other options such as sensors to detect the position of various components in the system may also be provided.

The combination tag is believed to have particular, although not exclusive, use in the processing of library materials. Library materials having an RFID tag of this type could be checked in and out more easily, perhaps without human assistance. That is, the materials would automatically be checked out to a particular patron (who may herself have an RFID tag associated with her library card) when the patron passes through a suitable detection zone, and checked back in when the patron re-enters the library with the materials. The tag of the invention may also assist in inventory management and analysis, by enabling library administrators to keep track of materials instantaneously and continuously. These and other features of the invention can, of course, be brought to bear on other applications, such as materials handling in stores, warehouses, and the like.

In another embodiment, the combination tag could provide dual-status marker information both through a magnetic response (indicating whether the magnetic features of the tag had been activated or deactivated) and through a radio frequency response (indicating, through the use of appropriate software, whether the database or the memory on the RFID chip itself showed that the item had been appropriately processed).

The following Examples provide still further information as to the tags used in the embodiments of the invention described in Section II, below.

EXAMPLE ONE

A combination tag was made in accordance with the present invention. A permalloy strip produced from an alloy available from the Carpenter Technology Corporation of Reading, Pa. under the designation "HyMu80" was attached to a test fixture manufactured by Single Chip Systems (SCS) of San Diego, Calif. The strip measured approximately 1.6 mm (0.625 in) wide by 0.0254 mm (0.001 in) thick by 10.16 cm (4 in) long. The test fixture consisted of a standard SCS 2.45 GHz antenna connected to an LED diode. The device was designed so that upon exposure to a 2.45 GHz field strong enough to power a typical SCS RFID tag the LED would glow, providing an immediate visible confirmation of the proper operation of the power-receiving portion of the device. Upon replacing the standard SCS antenna with the prototype permalloy antenna, the LED illuminated at approximately the same field strength, confirming the successful operation of the prototype.

EXAMPLE TWO

FIG. 3 illustrates another embodiment of an antenna that is believed useful with a 13.56 MHz RFID design. At this frequency, a coil-type antenna geometry is preferred. The spiral turns comprising the coil are formed from a magnetic alloy such as permalloy, either by etching (physical or chemical), die cutting, or deposition through a mask. The straight "arm" portions of the coil serve also as the magnetically responsive elements in this design. However, the reduced length of these metallic elements in this geometry limits the effectiveness of the magnetic security portion of the device. In the embodiment shown in FIG. 3, flux collection elements provided at the corners have been added to the antenna coil to overcome this limitation. The construction shown in FIG. 3 would, preferably, include a capacitor as previously described to tune the operating frequency of the antenna to the prescribed interrogation frequency.

The characteristics of the antenna described in this example were compared with the characteristics of known antennas for radio frequency integrated circuits, and because those characteristics were similar, it is believed that the antenna of this example would function adequately in such an application.

The embodiments of the present invention described below may use either a tag having only an RFID element, or a combination tag, both of which are described above.

II. Antenna System for RFID Interrogation System

A. General. The present invention relates to an antenna system for use with a number of items of interest, at least some of which include RFID elements. In a preferred embodiment, the antenna system includes a continuous antenna tape located adjacent the items, in which the antenna tape is either permanently or detachably connected to an RFID interrogation source, software for processing the information obtained by the antenna tape, and a controller that activates portions of the tape to enable the RFID interrogation source to obtain information from that portion of the tape. These and other features of the invention will be described in greater detail below. Although other applications are certainly within the scope of the present invention, a particularly convenient use of the present invention is for conducting an inventory of library items stored on shelves, and it is largely in that context that the present invention will be described.

B. System Components. Some of the components described in this section may be optional in certain applications of the present invention.

1. RFID Tagged Items. The system is intended to obtain information from and about items having RFID elements, which may be incorporated into (and referred to alternatively as) RFID tags. In some embodiments, combination tags of the type described above may be used of or in addition to RFID tags. In the case of library materials, the RFID tags may be located anywhere on the item, though it is preferred that the tag be located a predetermined distance above the bottom of the item so that all such items resting on a shelf will have RFID tags in approximately the same location. Preferred RFID tags do not have to be within the direct line of sight of the RFID interrogation source, and may be attached to a book, for example, on or near the binding. Because the antenna shelf tape is powered, and powers the RFID elements in the tags, smaller antennas may be used in the RFID tags, thereby decreasing both their size and cost.

2. RFID Interrogation Source. The RFID interrogation source is often referred to as an "RFID reader," or RFID device, and is adapted to interrogate an RFID tag to obtain information therefrom in a manner known in the art. The RFID reader may be stationary, portable, or even hand-held, and is adapted to use the antenna system of the present invention to interrogate the RFID tags. In other embodiments, the reader also has an antenna, to increase the read range of the reader. A number of manufacturers make RFID readers that can read a variety of different markers. The RFID reader could consist of a Commander 320 13.56 MHz RFID reader, manufactured by Texas Instruments of Dallas, Tex. A handheld reader module is available from I.D. Systems under the designation "flx-msr" which, although it has a limited read range due to its low power consumption, works well as a portable reader. Another reader unit is available from Phillips as a discovery kit to work with Phillips RFID markers, but Phillips is not believed to be commercializing the reader. Other readers that operate at higher frequencies include the Single Chip Systems' 2.45 GHz system, and Amtech's 900 MHz system. Any of these commercially available interrogation sources, or others now known or subsequently developed, may be used with an appropriately designed antenna shelf tape as the interrogation source. Because the RFID reader and the antenna tape described herein must work together to interrogate items of interest successfully, the particular antenna tape design to be implemented will depend on the interrogation frequency (and perhaps other features) of the RFID reader. Thus, specific statements of universally acceptable antenna system design parameters are very difficult to make.

3. Software. Once the RFID reader obtains information from the RFID tags, software is used to process and store the information in a manner selected by the user. This software is used to interrogate the reader and subsequently interrogate the tags. The software sends requests and commands from the host computer to the reader to obtain operation parameters and status checks from the reader. The reader software also has safeguards to verify that the commands sent to and from the reader are valid commands or responses.

After the RFID device reads the RFID tag, the device may transmit the item identification information to a computer having software provided by a library automation vendor, or LAV. Among approximately 50 current LAV software systems are "Dynix," which is available from Ameritech Library Services of Provo, Utah, "Carl ILS" which is available from CARL Corporation of Denver, Colo., and "DRA," which is available from DRA, of St. Louis, Mo. LAV software enables libraries to manage the flow of library materials through the library, and includes databases related to patrons, library materials and their status and availability, and the like.

4. Antenna. To facilitate the interrogation of the RFID tags, and the receipt of information from those tags, the present invention includes an antenna system that may be either continuous (and is thus referred to as "RFID shelf tape," "antenna shelf tape," or just "shelf tape", though the shelf tape is not necessarily adhesive as with regular tape), or discontinuous, although for ease of manufacture, application, and operation a continuous antenna system is normally preferred. Although the present invention can be effectuated with discrete antennae, it will be described with reference to a continuous antenna tape for convenience.

In one embodiment, tags having RFID elements are located in some or preferably all of the items in a given area of interest, and antenna shelf tape is located on or near the location of the items. The antenna shelf tape is powered, preferably by available AC current. When the RFID tags are interrogated by an RFID interrogation source (either a single source for the entire area, or multiple sources), that source is then quickly able to gain information as to the presence or absence of the item, and the identity of the item, optionally for comparison to a database. Thus, inventory can be conducted frequently, or even continuously, which is particularly useful in libraries.

Figure 9:
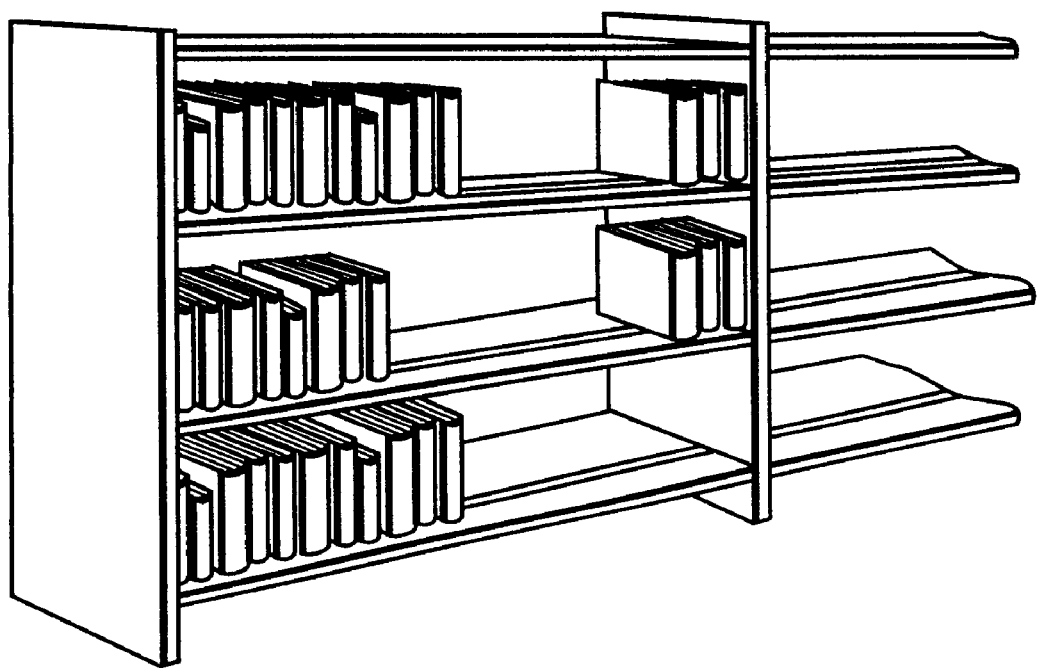
FIGS. 9 and 10 are illustrations of embodiments of the present invention.

Antenna shelf tape is illustrated in FIG. 9, and may be installed on one, more than one, or all of the shelves in a given area of interest. The antenna shelf tape may provide supplemental power to the RFID elements, which reduces the overall power needed to read the RFID elements in the tags associated with the library materials. Readers that require less power can be smaller, and thus easier to manipulate. Rather than use a handheld scanner that passes by individual items one after each other, a group of items may be read or scanned quickly in one operation using the antenna tape, which enables a user to conduct continuous tracking and inventory of items. Thus, an operator can determine in real time what items are stored or shelved where, which would greatly simplify, among other things, library inventory.

The antenna system of the present invention preferably functions in proximity to a variety of types of shelving materials. Shelves constructed of wood or plastic can affect the antenna tape, but the design of the antennas can be readily adapted to properly account for the different dielectric loadings applied to the antennas, as is known to those skilled in the art. Adhesive-backed antenna tape could, for example, be applied to the undersides of non-metallic shelves. In some libraries and data centers, metallic shelving will be present. It is therefore preferable that the antenna tape be designed to work in proximity to metallic shelving. In the application where the antenna tape would be used on a metal shelf, proper antenna design, including, for example, the addition of a dielectric spacer layer, may be required. The particular design required to optimize performance will depend on the operating frequency selected for the antenna shelf tape. For example, compatibility with metallic shelves could be achieved by spacing the antenna tape away from the metal shelf, perhaps by about 1.27 cm (0.5 inches) for RFID systems operating at frequencies at or below approximately 13.56 MHz. Above 13.56 MHz, the shelving itself may effectively be utilized in the antenna design and become an integral part of the antenna system. An alternative design for metal shelves would be to have the antenna tape over the books on the shelf directly above the books or other library materials.

To operate efficiently, each individual antenna in the assembly must have an adequate Q value, as is known in the art. The Q value describes the quality factor of the antenna, a measure of the loss, efficiency and bandwidth of the antenna. An adequate Q value would depend on other components of the system: the Q value of the markers, the Q value of any interrogation antenna associated with the interrogation source, and the signal bandwidth required by the interrogation electronics.

In one embodiment, the antenna tape of the present invention includes a control circuit that enables the reader to coordinate its interrogation with a specific, activated portion of the antenna tape. That is, the reader interrogates RFID tags associated with a specific segment of the antenna tape and obtains information from those tags, and then interrogates RFID tags associated with a different (preferably adjacent) segment of the antenna tape, and so on. This feature is referred to as addressability, and the control circuit may include a multiplexer circuit. Addressability is particularly useful for monitoring areas that are too large to be effectively monitored by a single antenna, although it is possible for one large antenna system to interrogate all items of interest at once. Under such a single-antenna system, the interrogation source would be unable to determine the order of the items, but would be able to determine whether and which items were present in the monitored area.

Figure 10:
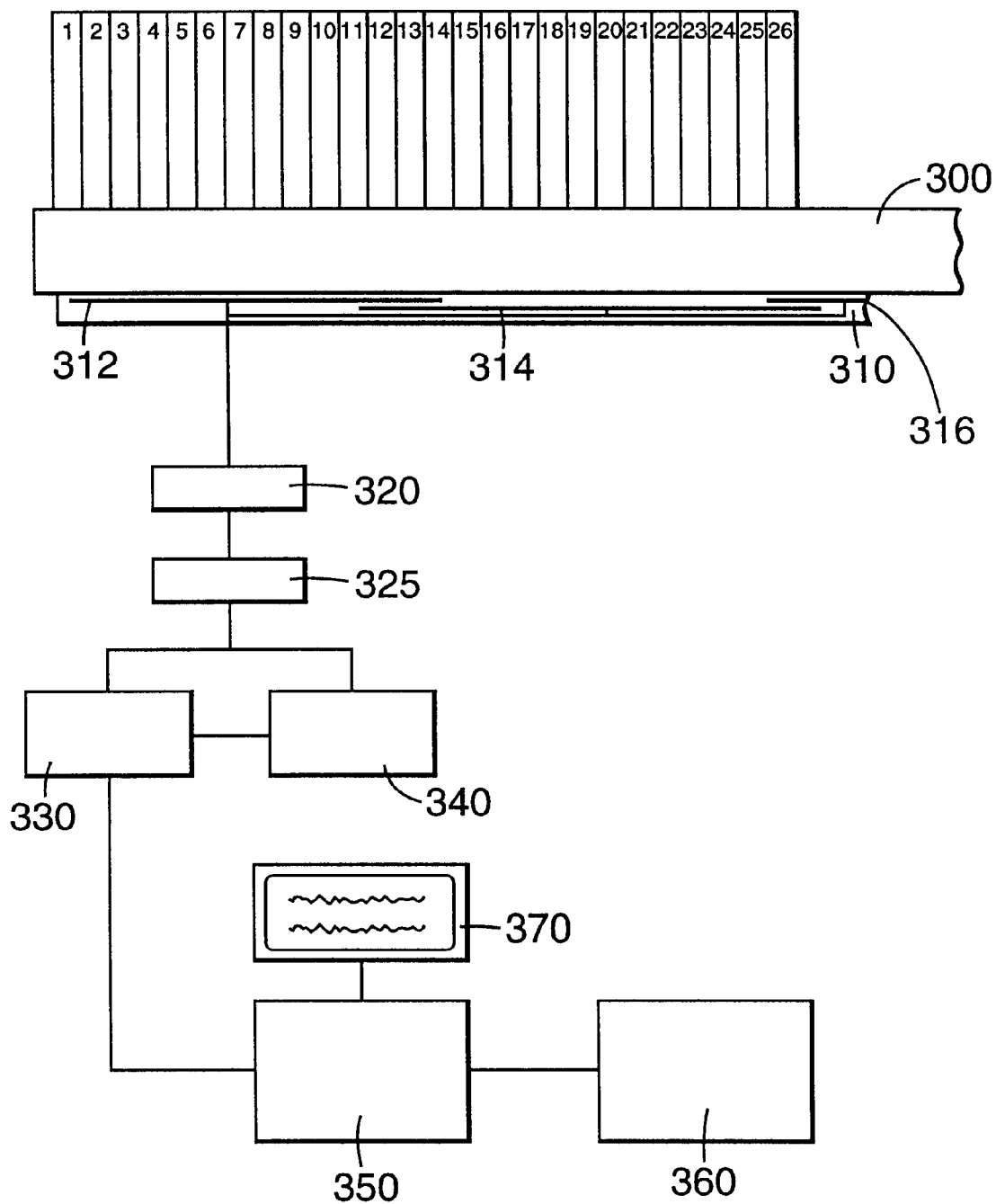

As explained in further detail below with reference to FIG. 10, the controller would send an address out to the antenna circuits. Only one specific antenna would then be enabled to read the RFID tags, which would be accomplished by means of a relay on the reader signal. After one antenna is read, the multiplexer circuit would increment, thereby activating a next, specified segment of the antenna tape. That antenna would assist the RFID reader to interrogate the RFID tags associated with that segment, and so on. It may be desirable to overlap the ranges of adjacent antenna elements, so that the first section reads, for example, the location associated with items 1 through 10, the second section reads the location associated with items 9 through 20, the third section reads the location associated with items 19 through 30, and so one. This arrangement is illustrated in FIG. 10, and is described in further detail below. The redundancy in interrogating the same items twice (items 9, 10, 19, and 20, in the above example) can be accounted for by the software, and insures that all items are properly interrogated at the junction between antenna elements. It would also be possible to interrogate specific segments of an antenna tape without a multiplexing circuit by, for example, manually activating and deactivating those segments of the antenna tape sequentially. This could be done by simple switch.

Addressability is particularly useful for determining the actual order of interrogated items, because it associates a specific location with specific items. The addressability also yields increased power to each antenna element. If there were no switches on the other elements, the circuit would act as a large power divider. This would result in a fraction of the overall power being sent to each element, thus reducing the probability of reading the tags.

The tape itself may comprise a continuous tape, or be sub-divided into predefined segments for use on specific shelves. One example of continuous tape would have demarcation points where the continuous antenna web could be cut, provided that the cuts should not sever an antenna element, or disrupt any of the addressing circuitry. At the demarcation point, the circuitry for connection to the reader could be added by a simple mechanical connection or electrically connecting to the tape (a capacitively-coupled connection). At the other end of the tape would be a termination to signify the number of elements. The first time that the circuit is employed, an initialization state would determine how many antenna elements are present, and the circuit addresses would be set. If a specific length tape were employed, the multiplexing circuit and connection to the reader electronics would be set up and ready for use.

In another embodiment, an RF amplifier provides additional signal strength to interrogate the RFID tag. The antenna tape supplies RF energy to energize or enable the tags and a reader subsequently reads the tags either by a handheld device or by the antenna tape itself via the antennae in the tape. The tape adds additional RF energy so that a handheld or shelf tape reader unit can read the tags with greater efficiency. Another embodiment of amplification is a basic RF amplifier (as shown in FIG. 10 at 325) placed in series with the reader signal line to increase the power going to the antennae on the tape, and increased signal processing or amplification of the return signal to help decipher the returning signal.

5. System Integration. The antenna tape would connect to interrogation and controlling electronics and, in turn, to appropriate LAV software. The antennas used with RFID devices (interrogation sources) could also be reduced in both size and cost, which would overcome current difficulties caused by copper wire antennas that are relatively large and bulky, and are expensive to produce. A continuous antenna tape would satisfy the need for an antenna system that is inexpensive, simple to install, and capable of localizing shelved articles with a fine degree of resolution, for example approximately 12 cm (4 inches) or less for a 13.56 MHz system. With appropriate hardware and software, the inventory and location of items in a given area could be completely automated.

In one embodiment, an RFID asset inventory system operates at an interrogation frequency of 13.56 MHz, which is in a frequency band that is reserved for industrial, scientific, or medical applications. With a suitable change in antenna design, this invention may be applied to a wide range of frequencies and applications. The interrogation amplitude is preferably low enough that magnetic media, commercial (non-hardened) semiconductor devices (including memory devices), and other electronic apparatus operating outside this band will not be adversely affected. The system preferably complies with all applicable FCC and European agency electromagnetic emission regulations.

As described further below with reference to FIG. 10, the RFID reader, control circuit, and other system components may either be associated with a specific segment or section of antenna tape, or may be associated with a hand-held or other RFID device that is attachable to and detachable from the antenna tape. In embodiments where a single antenna tape is used for all areas of interest, no such detachment may be required. In embodiments where multiple antenna tapes are used, a portable reader may be connected to a first segment of the antenna tape and activated, and then disconnected and connected to a successive segments of the antenna tape. In a large, fully automated application where a large number of antenna tapes are used, there may be one reader assigned to a specific area to read all the tapes in that area, i.e. one reader per shelf. A central computer could then control all reader and the entire system. In another embodiment of the invention, an RFID device could be coupled to the antenna tape system to interrogate the system without a physical connection. This contactless system would include a hand-held RFID device that would inductively couple with one or more coupling stations provided throughout the area of interest. The effect would be the same as with an actual physical coupling, but would provide additional benefits including reduced wear and tear on the system, and increased speed in coupling with multiple antennae.

One embodiment of an overall antenna tape and interrogation system is illustrated in FIG. 10. Certain items of interest 1 through 20 are arranged on a shelf 300, and each includes an RFID element associated with that item. Antenna tape 310 is secured to shelf 300, and includes individually addressable antenna elements 312, 314, 316, and so on. For applications in which the antenna tape is detachable from and attachable to the remainder of the system, a port (such as port 320) may be provided. It should be noted that portions of the system indicated as being detachable from the antenna tape, including reader 330 and control circuit 340, may be either upstream or downstream of a port, as desired. Reader 330 interrogates the antenna elements 312, 314, and 316 preferably sequentially, as those sections are activated by control circuit 340. Control circuit 340 preferably includes a multiplexer circuit. In the illustrated embodiment, as described above with reference to addressable antenna elements, a first antenna element 312 may interrogate the location associated with items 1 through 10, a second antenna element 314 may interrogate the location associated with items 9 through 20, and so on.

The information obtained by reader 330 may be transferred by suitable means, including wireless or wired connection, to a computer 350 that includes software and a database 360. The software may be LAV software or other software, and preferably interacts with the database to obtain information about items 1 through 20 or to transmit information about those items to the database. The results may be shown to a user on display 370.

One method of designing and implementing an antenna shelf tape system according to the present invention is described in the following manner. First, produce prototypes of flexible antenna tape containing a desired number of addressable individual antenna elements. These units will be placed in a line along the tape, and span any distance required. More antenna elements provide higher resolution (an increased ability to associate specific items with specific locations); less provide lower resolution. Two important parameters to be managed are obtaining and maintaining a proper impedance match from the first antenna to the last antenna along the tape, and maintaining equal power to all antennas so as to achieve equal read range. These parameters are easily managed by one of ordinary skill in the art.

Second, develop an interrogation electronics interface, an antenna interface design, and a method to permit the addressing of individual antennas on the tape. Third, write computer software to permit data acquisition from the antenna tape, as required. Fourth, demonstrate and evaluate the performance of the prototype design in the desired environment by, for example: a) mapping the radiation pattern of an individual antenna; b) determining the maximum read range of an individual antenna; c) assessing interference between adjacent antennas; d) evaluating the influence of the shelving, books, etc., adjacent to the reader tape on detection performance; e) assessing the efficiency of interrogation power transmission down the tape; and f) using the results from these investigations to determine the optimal antenna spacing and geometry.

RFID shelf tape may also be used for applications in other markets. For example, the system could be adapted to locate specific RF-tagged items in a collection of shelved video tapes, audio tapes, computer disks or tapes, or data cartridges such as one might encounter in a commercial or governmental data center. Other potential applications include inventory management, item tracking, logistics, and asset sorting. Persons of skill in the art will immediately realize that variations on the specific inventions disclosed herein are also within the scope of the present invention.

We claim:

1. An antenna system for use with items that each include an RFID element, wherein the antenna system comprises (a) multiple antennae, at least one of which can be selected to facilitate the interrogation of RFID elements adjacent a selected antenna(e), and (b) a control system for addressing antennas sequentially, so that the antenna system can determine the order of the items in a storage area.

2. An antenna system for use with items that each include an RFID element, wherein the antenna system comprises multiple antennae, at least one of which can be selected to facilitate the interrogation of RFID elements adjacent a selected antenna(e), wherein an initialization system determines how many antennae are present when the system is first used.

3. The antenna system of claim 2, wherein the initialization system sets circuit addresses when the system is first used.

4. An antenna system for use with items that each include an RFID element, wherein the antenna system comprises multiple antennae, at least one of which can be selected to facilitate the interrogation of RFID elements adjacent a selected antenna(e), and wherein the antenna system supplies RF energy to the RFID elements to enable them to be read by a portable RFID reader.

5. An antenna system for use with items that each include an RFID element, wherein the system comprises multiple antenna, at least one of which can be selected to facilitate the interrogation of RFID elements adjacent a selected antenna (e), and inventory is conducted to determine information regarding the presence or absence of items, and that information is available in real time to an operator.

6. The system of and one of claims 1 through 5, wherein the antennas are provided in the form of a longitudinally extending tape.

7. The antenna system of claim 6, wherein the antennae overlap along the length of the tape.

8. The system of any one of claims 1 through 5, wherein the system comprises a power source separate from power supplied by an RFID interrogation source.

9. The system of any of claims 1 through 5, wherein the system further comprises:

(c) a multiplexing circuit for selectively activating one or more antenna(e) for interrogation.

10. The system of any one of claims 1 through 5, wherein the system determines the order of the items.

11. The system of any one of claims 1 through 5, wherein the system includes an RF amplifier to increase the power of the signal produced.

12. The system of any one of claims 1 through 5, wherein the items are library materials.

13. The system of any one of claims 1 through 5, in combination with an RFID interrogation source and software for processing information obtained from the items.

14. The combination of claim 13, wherein the software includes an algorithm for determining whether the interrogated items are in a predetermined order.

* * * * *

UNITED STATES PATENT AND TRADEMARK OFFICE
CERTIFICATE OF CORRECTION

PATENT NO. : 6,600,420 B2
DATED : July 29, 2003
INVENTOR(S) : Goff, Edward D.

It is certified that error appears in the above-identified patent and that said Letters Patent is hereby corrected as shown below:

<u>Column 17,</u>
Line 3, "antenna" should read -- antennae --.
Line 8, "and" should read -- any --.

Signed and Sealed this

Eleventh Day of May, 2004

JON W. DUDAS
*Acting Director of the United States Patent and Trademark Office*